United States Patent
Bae et al.

(10) Patent No.: US 9,918,320 B2
(45) Date of Patent: Mar. 13, 2018

(54) METHOD AND APPARATUS FOR MANAGING CAPABILITY OF ELECTRONIC DEVICE IN WIRELESS COMMUNICATION SYSTEM

(71) Applicant: Samsung Electronics Co., Ltd., Gyeonggi-do (KR)

(72) Inventors: Yun-Gyu Bae, Gyeonggi-do (KR); Hong Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/374,097

(22) Filed: Dec. 9, 2016

(65) Prior Publication Data
US 2017/0171852 A1    Jun. 15, 2017

(30) Foreign Application Priority Data

Dec. 10, 2015    (KR) .......................... 10-2015-0176084

(51) Int. Cl.
*H04W 52/02*    (2009.01)
*H04W 72/04*    (2009.01)
(Continued)

(52) U.S. Cl.
CPC ......... *H04W 72/048* (2013.01); *H04W 48/04* (2013.01); *H04W 72/0413* (2013.01); *H04W 76/025* (2013.01); *H04W 84/042* (2013.01)

(58) Field of Classification Search
CPC ............ H04W 48/08; H04W 36/0061; H04W 72/005; H04W 36/0055; H04W 48/12;
(Continued)

(56) References Cited

U.S. PATENT DOCUMENTS

| | | | |
|---|---|---|---|
| 8,504,017 B1 * | 8/2013 | Hietalahti | H04W 48/18 455/426.1 |
| 2015/0173094 A1 | 6/2015 | Vangala et al. | |
| 2015/0256993 A1 | 9/2015 | Bellamkonda et al. | |

OTHER PUBLICATIONS

3GPP TS 36.306 V14.0.0, "3rd Generation Partnership Project; Technical Specification Group Radio Access Network; Evolved Universal Terrestrial Radio Access (E-UTRA): User Equipment (UE) radio access capabilities," Technical Specification Release 14, Sep. 2016, 63 pages, publisher 3GPP Organizational Partners (ARIB, ATIS CCSA, ETSI, TSDSI, TTA, TTC), Sophia Antipolis Cedex, Valbonne, France.

(Continued)

*Primary Examiner* — Phuoc H Doan

(57) ABSTRACT

Various embodiments of the present disclosure relate to an apparatus and method for transmitting capability information in an electronic device. Here, an electronic device may include: a memory configured to store a parameter corresponding to a wireless communication connection scheme which can be supported by the electronic device; a communication module, and a processor. The processor is configured to check first capability information on a plurality of connection schemes that can be supported by an external electronic device. The processor is further configured to select, based on the first capability information and the parameter, second capability information including at least one connection scheme that can be supported by the electronic device among the plurality of connection schemes. The processor is further configured to generate a message using the selected second capability information; and transmit the message to the external electronic device, using the communication module. Other embodiments can be made.

20 Claims, 12 Drawing Sheets

(51) Int. Cl.
  *H04W 48/04* (2009.01)
  *H04W 76/02* (2009.01)
  *H04W 84/04* (2009.01)
(58) Field of Classification Search
  CPC ... H04W 84/042; H04W 88/02; H04W 48/14; H04W 48/18; H04W 8/183; H04L 5/14
  USPC ..... 370/389, 252, 329; 455/435.3, 423, 458, 455/426.1
  See application file for complete search history.

(56) References Cited

OTHER PUBLICATIONS

ETSI TS 136 331 V10.7.0, "LTE; Evolved Universal Terrestrial Radio Access (E-UTRA); Radio Resource Control (RRC); Protocol specification," Technical Specification 3GPP TS 36.331 version 10.7.0 Release 10, Nov. 2012, 307 pages, publisher European Telecommunications Standards Institute, Sophia-Antiopolls Cedex, France.

\* cited by examiner

METHOD AND APPARATUS FOR MANAGING CAPABILITY OF ELECTRONIC DEVICE IN WIRELESS COMMUNICATION SYSTEM

CROSS-REFERENCE TO RELATED APPLICATION(S) AND CLAIM OF PRIORITY

The present application is related to and claims the priority under 35 U.S.C. § 119(a) of Korean Application Serial No. 10-2015-0176084, which was filed in the Korean Intellectual Property Office on Dec. 10, 2015, the entire content of which is hereby incorporated by reference.

TECHNICAL FIELD

Various embodiments of the present disclosure relate to an apparatus and method for transmitting capability information in an electronic device of a wireless communication system.

BACKGROUND

With the development of communication technologies, a wireless communication system may provide not only a voice communication service but also a high-speed data communication service to an electronic device.

In order to provide efficient communication with the electronic device, the network of the wireless communication system may establish or re-establish a communication service with the electronic device based on capability information of the electronic device. For example, when the electronic device is to use (access) the network, the network may transmit a control message requesting a capability report to the electronic device. When the control message requesting the capability report is received, the electronic device may transmit, to the network, all pieces of capability information which can be supported by the electronic device, in relation to information which the capability report has requested. The network may re-establish a communication service with the electronic device based on the capability report of the electronic device.

SUMMARY

The electronic device may transmit, to the network, all pieces of capability information which can be supported by the electronic device according to a standard determined in a communication standard (e.g., 3rd Generation Partnership Project (3GPP)). Accordingly, a signal for the capability report, which is transmitted by the electronic device, may have a large capacity. For example, a Long Term Evolution (LTE) system may provide a carrier aggregation function in order to further improve a transmission rate. The carrier aggregation function may represent a technology which allows an electronic device to transmit and receive data using multi-carriers. Accordingly, since the electronic device has to transmit the capability of a combination of carriers that can be aggregated, the signal to be transmitted for the capability report may increase in capacitance.

When a signal to be transmitted for the capability report is received from the electronic device, which has a relatively larger capacitance than other control signals, a network error may occur due to a problem such as decoding of the corresponding signal. For example, when the network fails to receive capability information of the electronic device in a process of registration, the network may fail to register the electronic device. For example, when the network fails to receive capability information of the electronic device in a process of channel allocation, the network may fail to allocate channels to the electronic device. For example, when the network fails to receive capability information of the electronic device during a Circuit Switched Fallback (CSFB) procedure, the call connection for a voice service may fail.

To address the above-discussed deficiencies, it is a primary object to provide an apparatus and method for efficiently transmitting capability information in an electronic device of a wireless communication system.

According to various embodiments of the present disclosure, an electronic device may include: a memory configured to store a parameter corresponding to a wireless communication connection scheme that can be supported by an electronic device; a communication module; and a processor, wherein the processor is configured to: check first capability information on a plurality of connection schemes that can be supported by an external electronic device; select, based on the first capability information and the parameter, second capability information including at least one connection scheme that can be supported by the electronic device among the plurality of connection schemes; generate a message using the selected second capability information; and transmit the message to the external electronic device, using the communication module.

According to various embodiments of the present disclosure, an electronic device may include: a memory configured to store a parameter corresponding to a wireless communication connection scheme can be supported by an the electronic device; a communication module; and a processor, wherein the processor is configured to check first capability information on a plurality of connection schemes which can be supported by at least one network in which mobile country codes of a Public Land Mobile Network (PLMN) code are identical; select, based on the first capability information and the parameter second capability information including at least one connection scheme supported by the electronic device among the plurality of connection schemes that can be supported by the at least one network; transmit a first message including the second capability information to the network, using the communication module; check, when an error related to the first message is detected, third capability information on a plurality of connection schemes which can be supported by a network corresponding to a mobile network code of the PLMN code; select fourth capability information including at least one connection scheme which can be supported by the electronic device from among the plurality of connection schemes, based on the third capability information and the parameter; and transmit a message including the fourth capability information to the network, using the communication module.

According to various embodiments of the present disclosure, a method for operating an electronic device may include: checking, by an electronic device, first capability information for/on a plurality of connection schemes that can be supported by an external electronic device; selecting, based on the first capability information, second capability information including at least one connection scheme which can be supported by the electronic device from among the plurality of connection schemes that can be supported by the external electronic device; generating a message using the second capability information; and transmitting the message to the external electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
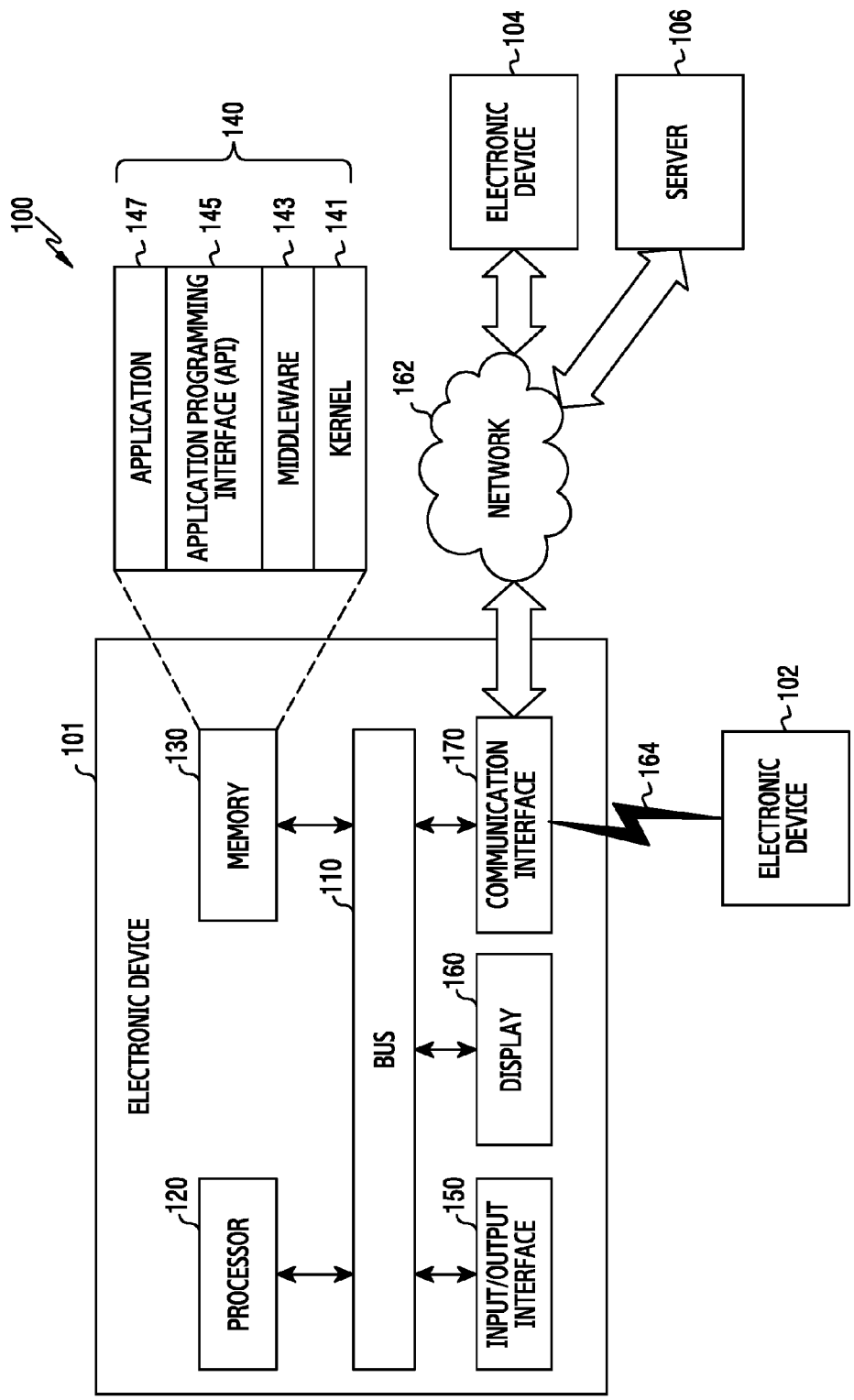
FIG. 1 illustrates an electronic device within a network environment according to various embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of the present disclosure will be described with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

The present disclosure may have various embodiments, and modifications and changes may be made therein. Therefore, the present disclosure will be described in detail with reference to particular embodiments shown in the accompanying drawings. However, it should be understood that the present disclosure is not limited to the particular embodiments, but includes all modifications/changes, equivalents, and/or alternatives falling within the spirit and the scope of the present disclosure. In describing the drawings, similar reference numerals may be used to designate similar elements.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, steps, operations, elements, parts, or a combination thereof described in the specifications, and do not preclude the presence or addition of one or more other features, numbers, steps, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" means (1) including at least one A, (2) including at least one B, or (3) including both at least one A and at least one B.

Although the term such as "first" and "second" used in various embodiments of the present disclosure may modify various elements of various embodiments, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., first element) is "connected to" or "(operatively or communicatively) coupled with/to" to another element (e.g., second element), the element may be directly connected or coupled to another element, and there may be an intervening element (e.g., third element) between the element and another element. To the contrary, it will be understood that when an element (e.g., first element) is "directly connected" or "directly coupled" to another element (e.g., second element), there is no intervening element (e.g., third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a Central Processing Unit (CPU) or an application processor (AP), capable of performing a corresponding operation by executing one or more software programs stored in a memory device.

The terms as used herein are used merely to describe certain embodiments and are not intended to limit the present disclosure. As used herein, singular forms may include plural forms as well unless the context explicitly indicates otherwise. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure, for example, may include at least one of a smartphone, a tablet personal computer (PC), a mobile phone, a video phone, an electronic book (e-book) reader, a desktop PC, a laptop PC, a netbook computer, a workstation, a server, a personal digital assistant (PDA), a portable multimedia player (PMP), an MP3 player, a mobile medical appliance, a camera, and a wearable device (e.g., smart glasses, a head-mounted-device (HMD), electronic clothes, an electronic bracelet, an electronic necklace, an electronic appcessory, an electronic tattoo, a smart mirror, or a smart watch).

According to some embodiments, the electronic device (ex. home appliance) may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

In the hereinafter following description, a network may include elements constituting a network, such as a base station (e.g., eNB), a communication controller (e.g., a Mobility Management Entity (MME)), and the like.

FIG. 1A illustrates an electronic device 101 within a network environment 100 according to various exemplary embodiments of the present invention.

Referring to FIG. 1, the electronic device 101 can include a bus 110, a processor 120 (e.g., including processing circuitry), a memory 130, an input output interface 150 (e.g., including input/output circuitry), a display 160 (e.g., including display circuitry), and a communication interface 170 (e.g., including communication circuitry). In any exemplary embodiment, the electronic device 101 can omit at least one of the constituent elements or additionally have another constituent element.

The bus 110 can, for example, include a circuit coupling the constituent elements 120 to 170 with one another and forwarding communication (e.g., a control message and/or data) between the constituent elements.

The processor 120 can include one or more of a Central Processing Unit (CPU), an Application Processor (AP), a Communication Processor (CP) or an Image Signal Processor (ISP). The processor 120 can, for example, execute operation or data processing for control and/or communication of at least one other constituent element of the electronic device 101.

According to an embodiment, the processor 120 may determine the size for a capability report of an electronic device 101 based on a connection scheme which can be supported by at least one external electronic device and the electronic device 101. For example, the connection scheme may include at least one of a frequency band and a Radio Access Technology (RAT). For example, the external electronic device may include at least one network having an identical Mobile Country Code (MCC) or at least one network having an identical Mobile Network Codes (MNC).

According to an embodiment, the processor 120 may determine the size of a message for a capability report of the electronic device 101, based a connection scheme which can be supported by at least one network having an identical mobile country code and the electronic device 101. For example, the processor 120 may receive system information (e.g., System Information Block (SIB)) provided by the network in a process of searching for a specific network to camp on. The processor 120 may acquire a Public Land Mobile Network (PLMN) code from the system information provided by a network. The processor 120 may acquire capability information on at least one network corresponding to a mobile country code of the PLMN code. For example, the processor 120 may detect a frequency band or RAT of at least one network corresponding to a mobile country code in a database stored in a memory 130. For example, when a forbidden list (e.g., Forbidden PLMN (FPLMN) exists, the processor 120 may acquire capability information on at least one network except for a network included in the forbidden list. For example, when the forbidden list (e.g., FPLMN) exists, the processor 120 may acquire capability information on at least one network having an identical mobile country code with consideration of a network included in the forbidden list. The processor 120 may update capability information corresponding to a mobile country code based on the capability that can be supported by the electronic device 101. For example, the processor 120 may extract capability information on a frequency band or RAT that can be supported by the electronic device 101, from among capability information on at least one network corresponding to a mobile country code, so as to generate a capability report message. The processor 120 may control the communication interface 170 so as to transmit a capability report message including updated capability information to the network.

According to an embodiment, the processor 120 may check whether an error has occurred due to the capability report message. For example, when a response for performing a registration process is not received from a network in a state where a Radio Resource Control (RRC) connection is established, the processor 120 may determine that an error has occurred due to the capability report message. For example, when an RRC connection release message is received during the network registration process by the electronic device 101 in a state where the RRC connection is established, the processor 120 may determine that an error has occurred due to the capability report message. For example, when a response to a request message for the CSFB transmitted to the network is not received, the processor 120 may determine that an error has occurred due to the capability report message.

According to an embodiment, when an error occurs due to a capability report message generated based on a connection scheme that can be supported by a network having an identical mobile country code and the electronic device 101, the processor 120 may reduce the size of the capability report message. For example, when an error has occurred due to a capability report message generated based on a mobile country code, the processor 120 may acquire capability information corresponding to a mobile network code of a PLMN code. For example, the processor 120 may acquire capability information on a frequency band or RAT that can be supported by a network corresponding to a mobile network code. The processor 120 may update capability information corresponding to a mobile network code based on a capability that can be supported by the electronic device 101. For example, the processor 120 may extract capability information on a frequency band or RAT that can be supported by the electronic device 101, from among capability information on a network corresponding to a mobile network code, so as to generate a capability report message. The processor 120 may control the communication interface 170 so as to transmit a capability report message including the updated capability information to the network. For example, the processor 120 may detect the frequency band or RAT of the network corresponding to the mobile network code in the database stored in the memory 130, or receive, from the network, the frequency band or RAT information of the corresponding network. For example, when an error has occurred due to the capability report message generated based on the mobile country code, the processor 120 may remove a network included in the forbidden list from the capability information message generated based on the mobile country code, so as to reduce the size of the capability information message.

According to an embodiment, when an error has occurred due to the capability report message generated based on the mobile country code and the forbidden list, the processor 120 may reduce the size of the capability report message. For example, when an error has occurred due to the capability report message generated based on the mobile country code and forbidden list, the processor 120 may acquire capability information corresponding to the mobile network code of the PLMN code. The processor 120 may update the capability information corresponding to the mobile network code based on the capability that can be supported by the electronic device 101. The processor 120 may control the communication interface 170 so as to transmit a capability report message including updated capability information to the network.

According to an embodiment, when information on a new frequency band or information on RAT is checked, the processor 120 may optionally add the same to the capability report list based on an error history of the corresponding frequency band or RAT. For example, when information on the new frequency band or RAT is received from the network, the processor 120 may check whether there is a history of an error occurrence for the corresponding frequency band or RAT. When there is no history of an error occurrence for the frequency band or RAT, the processor 120 may add the frequency band or RAT to the capability report list. When there is a history of an error occurrence for the frequency band or RAT, the processor 120 may limit the addition of the corresponding frequency band or RAT to the capability report list. For example, the capability report list may include a list of frequency bands or RATs included in the capability report message transmitted, by the electronic device 101, to the network.

The memory 130 may include a volatile memory and/or a non-volatile memory. The memory 130 may store commands or data related to one or more other elements of the electronic device 101.

According to an embodiment, the memory 130 may store at least one of a capability report list corresponding to a mobile country code, a capability report list corresponding to a mobile network code, or a capability report list that can be supported by the electronic device 101. For example, the capability report list corresponding to the mobile country code may include the frequency band or RAT information of at least one network in which mobile country codes are identical but mobile network codes are different from each other. For example, the capability report list corresponding to the mobile network code may include information on the frequency band or RAT of the network corresponding to the corresponding network code.

The memory 130 can include a volatile and/or non-volatile memory. The memory 130 can, for example, store an instruction or data (e.g., a reference normal map) related to at least one other constituent element of the electronic device 101. According to one exemplary embodiment, the memory 130 can store a software and/or program 140. For example, the program 140 can include a kernel 141, a middleware 143, an Application Programming Interface (API) 145, an application program (or "application") 147, etc. At least a part of the kernel 141, the middleware 143, or the API 145 can be called an Operating System (OS).

The kernel 141 can, for example, control or manage system resources (e.g., the bus 110, the processor 120, the memory 130, etc.) that are used for executing operations or functions implemented in other programs (e.g., the middleware 143, the API 145, or the application program 147). Also, the kernel 141 can provide an interface that is capable of controlling or managing the system resources by enabling the middleware 143, the API 145, or the application program 147 to gain access to the individual constituent element of the electronic device 101.

The middleware 143 can, for example, perform a relay role of enabling the API 145 or the application program 147 to communicate and exchange data with the kernel 141. Also, the middleware 143 can process one or more work requests received from the application program 147 in accordance with the order of priority. For example, the middleware 143 can grant at least one of the application programs 147 the order of priority capable of using the system resources (e.g., the bus 110, the processor 120, the memory 130, etc.) of the electronic device 101, and process the one or more work requests. The API 145 is, for example, an interface of enabling the application program 147 to control a function of the kernel 141 or the middleware 143, and can, for example, include at least one interface or function (e.g., instruction) for file control, window control, picture processing, character control, etc.

The input/output interface 150 may function as, for example, an interface that may transfer instructions or data input from a user or another external device to the other element(s) of the electronic device 101. Furthermore, the input/output interface 150 may output the instructions or data received from the other element(s) of the electronic device 101 to the user or another external device.

The display 160 may include, for example, a Liquid Crystal Display (LCD), a Light-Emitting Diode (LED) display, an Organic Light-Emitting Diode (OLED) display, a MicroElectroMechanical Systems (MEMS) display, and an electronic paper display. The display 160 may display, for example, various types of contents (for example, text, images, videos, icons, or symbols) for the user. The display 160 may include a touch screen and receive, for example, a touch, gesture, proximity, or hovering input by using an electronic pen or the user's body part. Thus, the display 160 may be referred to as a touch screen.

The communication interface 170 may set communication between, for example, the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use at least one of, for example, Long Term Evolution (LTE), LTE-Advance (LTE-A), Code Division Multiple Access (CDMA), Wideband CDMA (WCDMA), Universal Mobile Telecommunications System (UMTS), WiBro (Wireless Broadband), and Global System for Mobile Communications (GSM), as a cellular communication protocol. Further, the wireless communication may include, for example, short-range communication 164. The short-range communication may include at least one of, for example, Wi-Fi, Bluetooth, Near Field Communication (NFC), and Global Navigation Satellite System (GNSS). The GNSS may include at least one of, for example, a Global Positioning System (GPS), a Global Navigation Satellite System (Glonass), a Beidou Navigation Satellite System (hereinafter referred to as "Beidou"), and a European Global Satellite-based Navigation System (Galileo), according to a use area, a bandwidth, or the like. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard-232 (RS-232, and a Plain Old Telephone Service (POTS). The network 162 may include at least one of a communication network such as a computer network (e.g., a LAN or a WAN), the Internet, and a telephone network.

Each of the first and second external electronic devices 102 and 104 may be a device which is the same as or different from the electronic device 101. According to an embodiment, the server 106 may include a group of one or more servers. According to various embodiments, all or some of the operations performed in the electronic device 101 may be performed in another electronic device or a plurality of electronic devices (e.g., the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
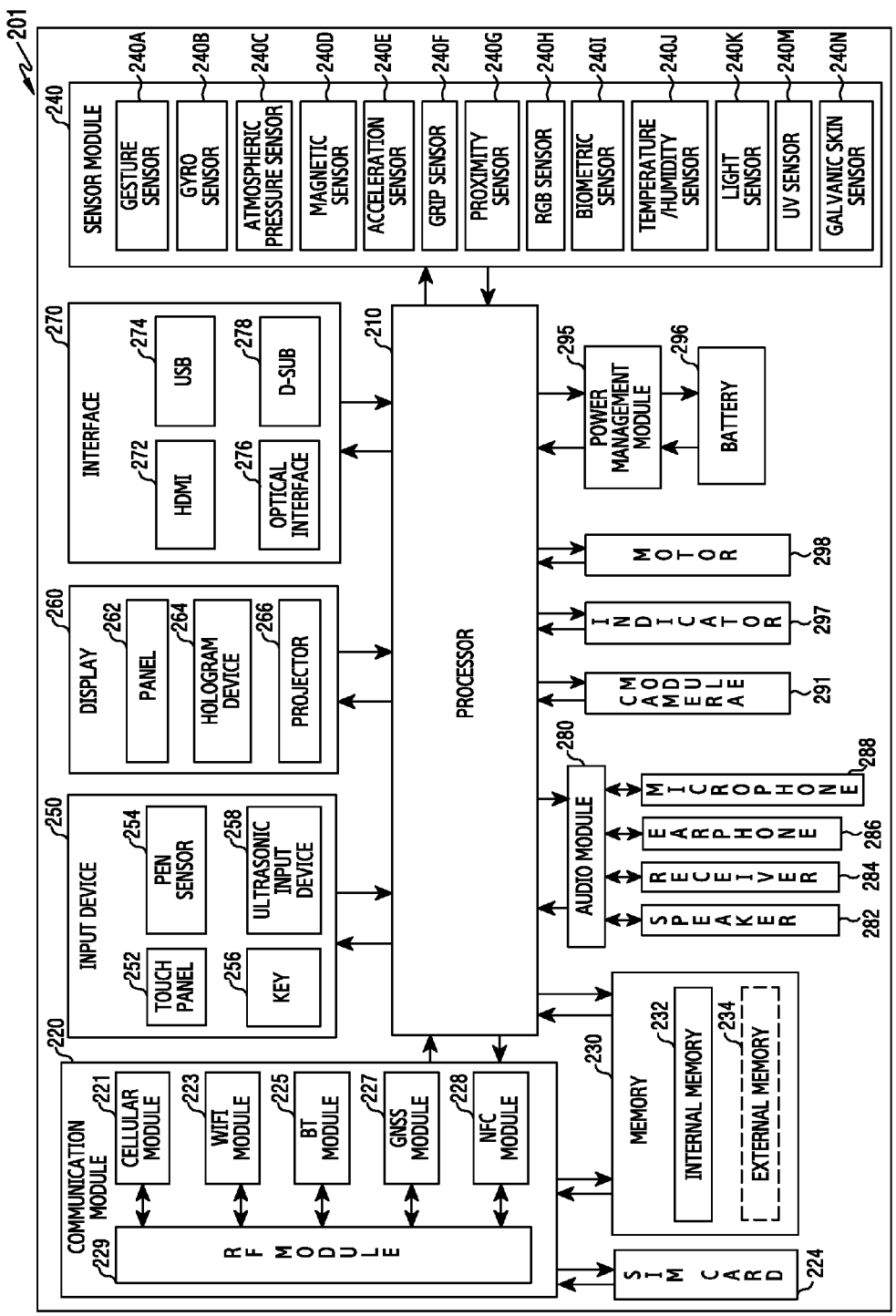
FIG. 2 illustrates a block diagram of an electronic device according to various embodiments of the present disclosure.

FIG. 2 illustrates a detailed block diagram of an electronic device according to an exemplary embodiment of the present disclosure. In the following description, the electronic device 201 may be, for example, the electronic device 101 illustrated in FIG. 1.

Referring to FIG. 2, the electronic device 201 may include one or more processors (for example, an AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run, for example, an operating system (OS) or application program to control a plurality of hardware or software components connected to the processors 210 and may perform various kinds of data processing and operations. The processors 210 may be configured, for example, as a system on chip (SoC). According to one exemplary embodiment, the processors 210 may further include a graphic processing unit (GPU) and/or an image signal processor. The processors 210 may include at least part (for example, a cellular module 221) of the components illustrated in FIG. 2. The processors 210 may load a command or data received from at least one of other components (for example, a nonvolatile memory) into a volatile memory to process the command or data and may store various kinds of data in the nonvolatile memory.

The communication module 220 may have a configuration the same as or similar to that of the communication interface 170 in FIG. 1. The communication module 220 may include, for example, a cellular module 221, a Wi-Fi module 223, a Bluetooth module 225, a global navigation satellite system (GNSS) module 227 (for example, a global positioning system (GPS) module, a Glonass module, a Beidou module, or a Galileo module), a near field communication (NFC) module 228, and a radio frequency (RF) module 229.

The cellular module 221 may provide, for example, a voice call, a video call, a text message service, an Internet service, etc. through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a communication processor (CP). For example, the cellular module 221 may determine the size for a capability report of the electronic device 201 based on a connection scheme that can be supported by at least one external electronic device and a connection scheme that can be supported by the electronic device 201. For example, the connection scheme may include at least one of a frequency band and a Radio Access Technology (RAT). For example, the external electronic device may include at least one network having an identical mobile country code (MCC) or at least one network having an identical Mobile Network Code (MNC).

The Wi-Fi module 223, the BT module 225, the GNSS module 227, or the NFC module 228 may include, for example, a processor for processing data that is transmitted and received through the corresponding module. According to some embodiments, at least some (two or more) of the cellular module 221, the Wi-Fi module 223, the Bluetooth module 225, the GNSS module 227, and the NFC module 228 may be included in one Integrated Chip (IC) or IC package.

The RF module 229 may transmit and receive, for example, a communication signal (for example, an RF signal). The RF module 229 may include, for example, a transceiver, a power amplifier (amp) module (PAM), a frequency filter, a low noise amplifier (LNA), an antenna, or the like. According to another exemplary embodiment, at least one of the cellular module 221, the Wi-Fi module 223, the Bluetooth module 225, the GNSS module 227, and the NFC module 228 may transmit and receive an RF signal through a separate RF module.

The SIM 224 may include, for example, a card including an SIM and/or an embedded SIM and may include unique identification information (for example, an integrated circuit card identifier (ICCID)) or subscriber information (for example, an international mobile subscriber identity (IMSI)).

The memory 230 (for example, a memory 130) may include, for example, an internal memory 232 or an external memory 234. The internal memory 232 may include, for example, at least one of a volatile memory (for example, a dynamic random-access memory (DRAM), a static RAM (SRAM), a synchronous dynamic RAM (SDRAM), or the like) and a nonvolatile memory (for example, a one-time programmable read-only memory (OTPROM), a programmable ROM (PROM), an erasable and programmable ROM (EPROM), an electrically erasable and a programmable ROM (EEPROM), a mask ROM, a flash ROM, a flash memory (for example, an NAND flash, an NOR flash, or the like), a hard drive, or a solid state drive (SSD)).

The external memory 234 may further include a flash drive, for example, a compact flash (CF), a secure digital (SD), a micro secure digital (micro-SD), a mini secure digital (mini-SD), an extreme digital (xD), a multi-media card (MMC), a memory stick, or the like. The external memory 234 may be functionally and/or physically connected to the electronic device 201 through various interfaces.

The sensor module 240 may measure, for example, physical quantities or detect an operation state of the electronic device 201 and convert measured or detected information into an electrical signal. The sensor module 240 may include, for example, at least one of a gesture sensor 240A, a gyro sensor 240B, a barometric pressure sensor 240C (atmospheric pressure sensor), a magnetic sensor 240D, an accelerometer 240E, a grip sensor 240F, a proximity sensor 240G. a color sensor 240H (for example, a red, green, and blue (RGB) sensor), a biometric sensor 240I, a temperature/humidity sensor 240J, a illumination sensor 240K, a ultraviolet (UV) sensor 240M, and a galvanic skin reflex (GRS) sensor 240N. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, an ultrasonic sensor, and/or a fingerprint sensor. The sensor module 240 may further include a control circuit to control at least one or more sensors belonging thereto. In one exemplary embodiment, the electronic device 201 may further include a processor configured, as a part of the processors 210 or separately from the processors 210, to control the sensor module 240, thereby controlling the sensor module 240 while the processors 210 is in a sleep state.

The input device 250 may include, for example, a touch panel 252, a (digital) pen sensor 254, a key 256, or an ultrasonic input device 258. The touch panel 252 may use, for example, at least one of an electrostatic type, a pressure-sensitive type, an infrared type, and an ultrasonic type. Further, the touch panel 252 may further include a control circuit. The touch panel 252 may further include a tactile layer to provide a user with a tactile response.

The (digital) pen sensor 254 may, for example, be part of the touch panel or include a separate recognition sheet. The key 256 may include, for example, a physical button, an optical key, or a keypad. The ultrasonic input device 258 may detect ultrasonic waves generated in an input tool through a microphone (for example, a microphone 288) and identify data corresponding to the detected ultrasonic waves.

The display 260 (for example, a display 160) may include a panel 262, a hologram device 264, or a projector 266. The panel 262 may include a configuration that is the same as or similar to that of the display 160 of FIG. 1. The panel 262 may be configured, for example, to be flexible, transparent, or wearable. The panel 262 may be formed with the touch panel 252 in a single module. According to one exemplary embodiment, the panel 262 may include a pressure sensor (or force sensor) to measure the strength of pressure by a user touch. The pressure sensor may be configured in an integrated form with the touch panel 252 or be configured as one or more sensors separate from the touch panel 252. The hologram device 264 may display a three-dimensional image in the air using the interference of light. The projector 266 may project light onto a screen to display an image. The screen may be disposed, for example, inside or outside the electronic device 201. According to one exemplary embodiment, the display 260 may further include a control circuit to control the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included, for example, in the communication interface 170 illustrated in FIG. 1. Additionally or alternatively, the interface 270 may include, for example, a mobile high-definition link (MHL) interface, an SD card/MMC interface, or an Infrared Data Association (IrDA) interface.

The audio module 280 may convert, for example, a sound and an electrical signal reciprocally. At least some components of the audio module 280 may be included, for example, in an input/output interface 150 illustrated in FIG. 1. The audio module 280 may process sound information input or output, for example, through a speaker 282, a receiver 284, earphones 286, or the microphone 288.

The camera module 291 is a device that takes, for example, a still image and a video. According to one exemplary embodiment, the camera module 291 may include one or more image sensors (for example, a front sensor or a rear sensor), a lens, an image signal processor (ISP), or a flash (for example, an LED, a xenon lamp, or the like).

The power management module 295 may manage, for example, the power of the electronic device 201. According to one exemplary embodiment, the power management module 295 may include a power management integrated circuit (PMIC), a charger integrated circuit (IC), or a battery or fuel gauge. The power management module 295 may be supplied with power from the outside via a cable and/or wirelessly. For example, the power management module 295 may be supplied with power from the outside using a wireless charging method, such as a magnetic resonance method, a magnetic induction method, or an electromagnetic wave method. The power management module 295 may further include an additional circuit, such as a coil loop, a resonance circuit, or a rectifier, to be supplied with power wirelessly. The battery gauge may measure, for example, the remaining battery charge, the charging voltage, the current, or temperature of the battery 296.

The battery 296 may include, for example, a rechargeable battery and/or a solar battery. According to one exemplary embodiment, the battery 296 may include a plurality of cells connectable in series or in parallel.

The indicator 297 may display a specific state of the electronic device 201 or a component thereof (for example, the processors 210), for example, a booting state, a message state, or a charging state. The motor 298 may convert an electrical signal into mechanical vibrations and may generate vibrations or a haptic effect. Although not shown, the electronic device 201 may include a processing device for supporting a mobile TV (for example, a GPU). The processing device for supporting the mobile TV may process media data in accordance with digital multimedia broadcasting (DMB), digital video broadcasting (DVB), or media-Flo™ standards.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

Figure 3:
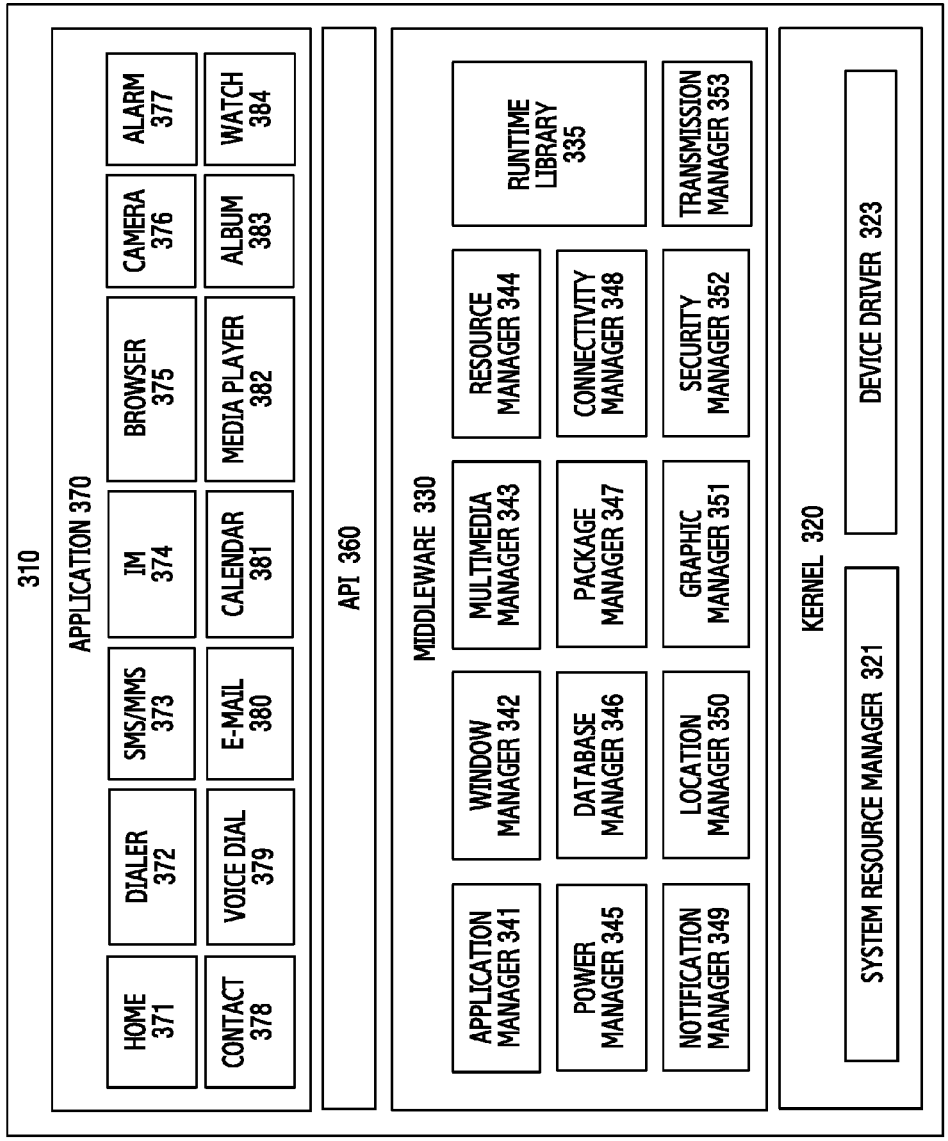
FIG. 3 illustrates a block diagram of a program module according to various embodiments of the present disclosure.

FIG. 3 illustrates a block diagram of a program module according to various exemplary embodiments. According to one exemplary embodiment, the program module 310 (e.g., the program 140) can include an Operating System (OS) controlling resources related to an electronic device (e.g., the electronic device 101), and/or various applications (e.g., the application program 147) run on the operating system. The operating system can, for example, include Android™, iOS™, Windows™, Symbian™, Tizen™, or Bada™.

Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least some of the program module 310 can be preloaded onto an electronic device, or can be downloaded from an external electronic device (e.g., the electronic device 102, 104, the server 106, etc.).

The kernel 320 can, for example, include a system resource manager 321 and/or a device driver 323. The system resource manager 321 can perform the control of system resources, the allocation thereof, or the recovery thereof. According to one exemplary embodiment, the system resource manager 321 can include a process management unit, a memory management unit, or a file system management unit. The device driver 323 can, for example, include a display driver, a camera driver, a Bluetooth driver, a shared memory driver, a USB driver, a keypad driver, a WiFi driver, an audio driver, or an Inter-Process Communication (IPC) driver. The middleware 330 can, for example, provide a function that the application 370 commonly uses, or provide various functions to the application 370 through the API 360 so that the application 370 may make use of restricted system resources within an electronic device. According to one exemplary embodiment, the middleware 330 can include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352 or a transmission manager 353.

The runtime library 335 can, for example, include a library module that a compiler uses so as to add a new function through a programming language while the application 370 is executed. The runtime library 335 can perform input output management, memory management, or arithmetic function processing. The application manager 341 can, for example, manage a lifecycle of the application 370. The window manager 342 can manage a GUI resource that is used in a screen. The multimedia manager 343 can determine a format used for playing of media files, and perform the encoding or decoding of the media file by using a codec suitable for the corresponding format. The resource manager 344 can manage a source code of the application 370 or a space of a memory. The power manager 345 can, for example, manage a battery capacity or a power source, and provide power information used for an operation of an electronic device. According to one exemplary embodiment, the power manager 345 can interwork with a Basic Input/Output System (BIOS). The database manager 346 can, for example, generate, search or change a database that will be used in the application 370. The package manager 347 can manage the installation or updating of an application distributed in a form of a package file.

The connectivity manager 348 can, for example, manage wireless connectivity. The notification manager 349 can, for example, provide events such as an arrival message, an appointment, a proximity notification, etc. to a user. The location manager 350 can, for example, manage location information of an electronic device. The graphic manager 351 can, for example, manage a graphic effect that will be provided to the user, or a user interface related with this. The security manager 352 can, for example, provide system security or user authentication. The transmission manager 353 may determine the size for the performance report of the electronic device 201 based on the connection scheme supported by the at least one external electronic device and the connection scheme supported by the electronic device 201. According to one exemplary embodiment, the middleware 330 can include a telephony manager for managing a voice or video telephony function of the electronic device, or a middleware module capable of forming a combination of functions of the aforementioned constituent elements. According to one exemplary embodiment, the middleware 330 can provide a module that is specialized by operating system type. The middleware 330 can dynamically delete some of the existing constituent elements or add new constituent elements. The API 360 is, for example, a set of API programming functions, and can be provided to have another construction in accordance with an operating system. For example, Android or iOS can provide one API set by platform, and Tizen can provide two or more API sets by platform.

The application 370 can, for example, include a home 371, a dialer 372, a Short Message Service (SMS)/Multimedia Message Service (MMS) 373, an Instant Message (IM) 374, a browser 375, a camera 376, an alarm 377, a contact 378, a voice dial 379, an electronic mail (e-mail) 380, a calendar 381, a media player 382, an album 383, a watch 384, health care (e.g., measuring a momentum, a blood sugar, etc.), or an environment information (e.g., air pressure, humidity, temperature information) provision application. According to one exemplary embodiment, the application 370 can include an information exchange application capable of supporting information exchange between an electronic device and an external electronic device. The information exchange application can, for example, include a notification relay application for relaying specific information to the external electronic device, or a device management application for managing the external electronic device. For example, the notification relay application can relay notification information, which is generated in another application of the electronic device, to the external electronic device, or can receive notification information from the external electronic device and provide the received notification information to a user. The device management application can, for example, install, delete, or update a function (e.g., the turn-on/turn-off of the external electronic device itself or some constituent components thereof or the adjustment of a brightness or resolution of a display) of the external electronic device communicating with the electronic device, or an application operating in the external electronic device. According to one exemplary embodiment, the application 370 can include an application (e.g., a health care application of a mobile medical instrument) designated according to an attribute of the external electronic device. According to one exemplary embodiment, the application 370 can include an application received from the external electronic device. At least a part of the program module 310 can be implemented (e.g., executed) by software, firmware, hardware (e.g., the processor 210) or a combination of at least two or more of them, and can include a module for performing one or more functions, a program, a routine, sets of instructions, or a process.

According to various embodiments of the present disclosure, an electronic device may include: a memory configured to store a parameter corresponding to a wireless communication connection scheme that can be supported by an electronic device; a communication module; and a processor, wherein the processor is configured to: check first capability information on a plurality of connection schemes that can be supported by an external electronic device; select, among the plurality of connection schemes, second capability information including at least one connection scheme that can be supported by the electronic device, based on the first capability information and the parameter; generate a message using the selected second capability information; and transmit the message to the external electronic device, using the communication module.

According to various embodiments, when the identification information on the external electronic device belongs to one or more pieces of identification information on one or more external electronic devices for which connections are permitted, the processor may be configured to acquire the capability of the external electronic device.

According to various embodiments, the processor may be configured to check information on an error, in relation to the second capability information, which has previously occurred in a process of connecting with the external electronic device, and refrain from selecting at least a part of the second capability when the second capability information is included in the error information.

According to various embodiments, the processor may be configured to: receive a response message from the external electronic device, using the communication module; and when the response message includes error information related to the second capability information, select third capability information by using the first capability information and the error information, wherein the third capability information may be selected such that the size is smaller than that of the second capability information.

According to various embodiments, the external electronic device includes networks, wherein the processor may be configured to make a request for the first capability information to at least one network, among the networks, in which mobile country codes of the public land mobile network (PLMN) code are identical but mobile network codes are different from each other.

According to various embodiments, the external electronic device includes networks, and the processor may be configured to make a request for the first capability information to at least one network, among the networks, which correspond to a mobile network code included in the PLMN code.

According to various embodiments, the connection scheme may include at least one frequency band or at least one Radio Access Technology (RAT).

According to various embodiments of the present disclosure, an electronic device may include: a memory configured to store a parameter corresponding to a wireless communication connection scheme that can be supported by an electronic device; a communication module; and a processor, wherein the processor is configured to: check first capability information on a plurality of connection schemes that can be supported by at least one network in which mobile country codes of a public land mobile network code are identical; select second capability information including at least one connection scheme that can be supported by the electronic device among the plurality of connection schemes, based on the first capability information and the parameter; transmit a first message including the second capability information to the network, using the communication module; check, when an error related to the first message is detected, third capability information on a plurality of connection schemes that can be supported by a network corresponding to a mobile network code of the PLMN code; select fourth capability information including at least one connection scheme that can be supported by the electronic device among the plurality of connection schemes, based on the third capability information and the parameter; and transmit a message including the fourth capability information to the network, using the communication module.

According to various embodiments, the processor may be configured to check first capability information on a plurality of connection schemes that can be supported by at least one network in which mobile country codes of the PLMN code are identical and mobile network codes thereof are different from each other.

According to various embodiments, when a Forbidden PLMN (FPLMN) list exists, the processor may be configured to check, except for network information included in the FPLMN, first capability information on a plurality of connection schemes that can be supported by at least one network in which mobile country codes of the PLMN code are identical and mobile network codes thereof are different from each other.

Figure 4:
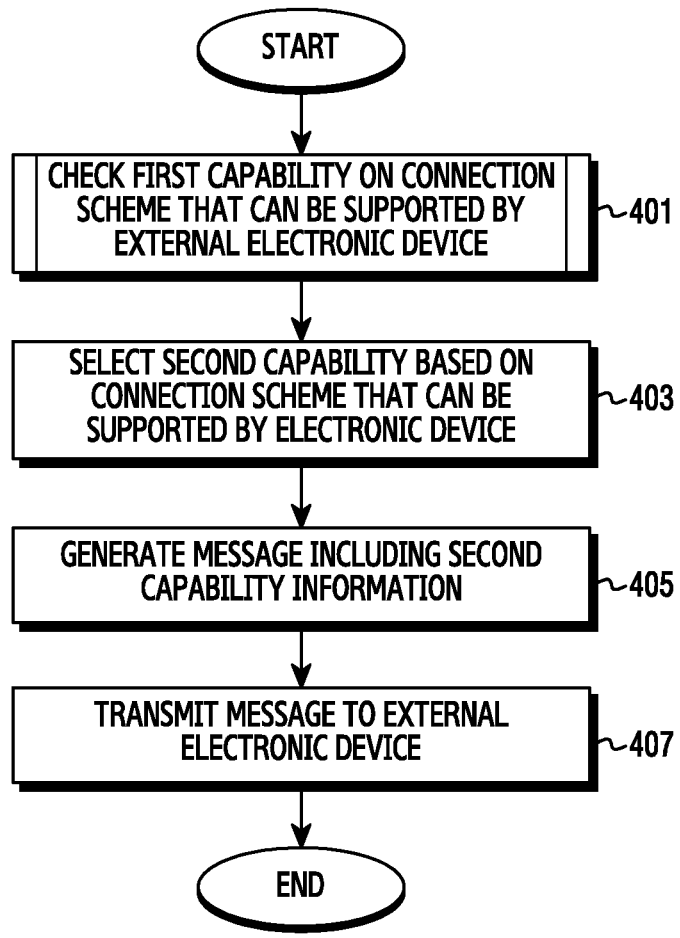
FIG. 4 is a flow chart illustrating the transmission of capability information in an electronic device according to various embodiments of the present disclosure.

FIG. 4 is a flow chart illustrating the transmission of capability information in an electronic device according to various embodiments of the present disclosure. According to an embodiment, the electronic device may include the electronic device 101 of FIG. 1. the electronic device 201 of FIG. 2, at least some of the electronic device 101 (e.g., the processor 120), or at least some of the electronic device 201 (e.g., a communication processor).

Referring to FIG. 4, in operation 401, the electronic device may check first capability information on a connection scheme that can be supported by an external electronic device. For example, the processor 120 may acquire a PLMN code of a network in a process of camping on the network. For example, the processor 120 may acquire the PLMN code of the network from system information (SIB) acquired at the time of a registration procedure to the network. The processor 120 may acquire first capability information on a frequency band or RAT for at least one network in which mobile country codes are identical and mobile network codes are different from each other, which are included in the PLMN code. For example, the processor 120 may acquire the first capability information on the frequency band or RAT for the network corresponding to the mobile network code included in the PLMN code.

In operation 403, the electronic device may select second capability information based on a connection scheme that can be supported by the electronic device. For example, the processor 120 may extract capability information on a frequency band or RAT that can be supported by the electronic device 101, from among capability information on at least one network corresponding to a mobile country code, so as to generate second capability information. For example, the processor 120 may extract capability information on a frequency band or RAT that can be supported by the electronic device 101, from among capability information on the network corresponding to a mobile network code, so as to generate second capability information.

In operation 405, the electronic device may generate a capability report message including second capability information selected based on a connection scheme that can be supported by the electronic device. For example, when a capability request (a UE capability enquiry) message is received from the network, the processor 120 may generate a capability report (UE capability information) message including second capability information generated based on a connection scheme that can be supported by the electronic device.

In operation 407, the electronic device may transmit, to the external device, the capability report message including the second capability information. For example, the processor 120 may control the communication interface 170 so as to transmit the capability report message including the second capability information to a base station.

Figure 5:
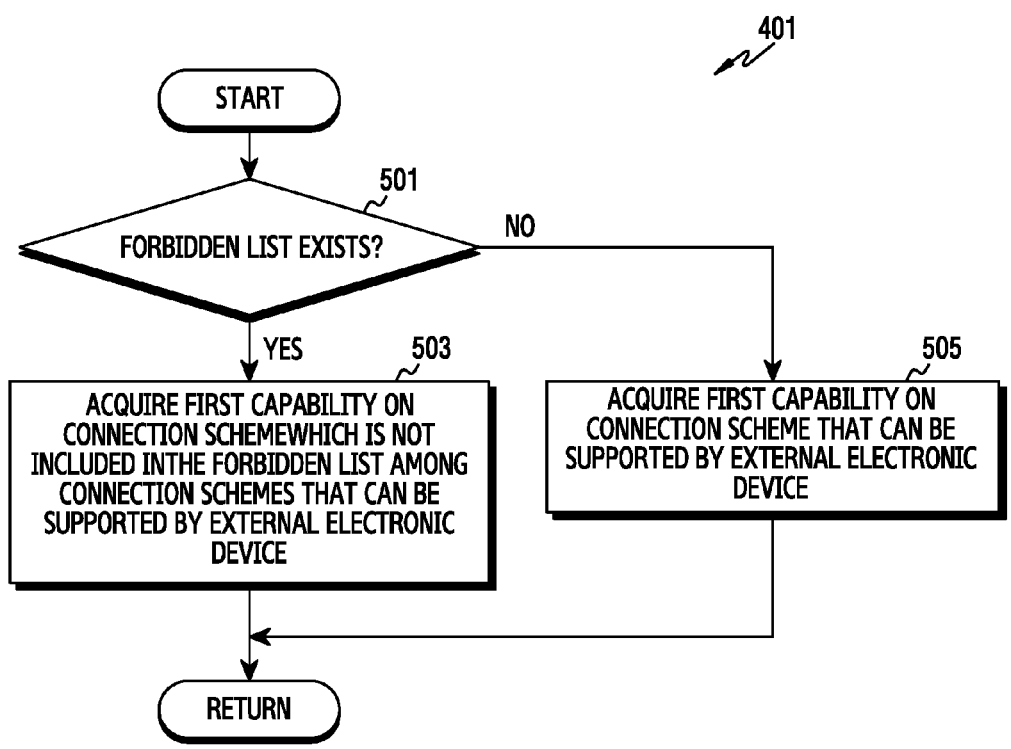
FIG. 5 is a flow chart illustrating the acquisition of capability information of an electronic device based on a forbidden list in an electronic device according to various embodiments of the present disclosure.

FIG. 5 is a flow chart illustrating the acquisition of capability information of an electronic device based on a forbidden list in an electronic device according to various embodiments of the present disclosure. The following description will be made with reference to operation 401 of FIG. 4, in which first capability information on a connection scheme that can be supported by an external electronic device is checked. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 5, in operation 501, the electronic device may check whether a forbidden list stored in the electronic device exists. For example, the processor 120 may check whether FPLMN information is stored in a subscriber identification module (SIM) card of the electronic device 101.

In operation 503, when the forbidden list stored in the electronic device exists, the electronic device may acquire first capability information on a connection scheme that can be supported by an external electronic device which is not included in the forbidden list. For example, when the FPLMN list is stored in the subscriber identification card, the processor 120 may acquire first capability information on a frequency band or RAT for at least one network other than a network included in the FPLMN list among the at least one network in which mobile country codes included in the PLMN code are identical.

In operation 505, when the forbidden list stored in the electronic device does not exist, the electronic device may acquire first capability information on a connection scheme that can be supported by the external electronic device. For example, the processor 120 may acquire first capability information on the frequency band or RAT for the at least one network in which mobile country codes included in the PLMN codes are identical and mobile network codes thereof are different from each other.

According to various embodiments of the present disclosure, an electronic device may acquire, without considering a forbidden list, first capability information on a connection scheme that can be supported by an external electronic device (e.g., operation 401 of FIG. 4). For example, the processor 120 may acquire, regardless of whether the forbidden list is included or not, first capability information on the frequency band or RAT for the at least one network in which mobile country codes included in the PLMN codes are identical and mobile network codes thereof are different from each other.

Figure 6:
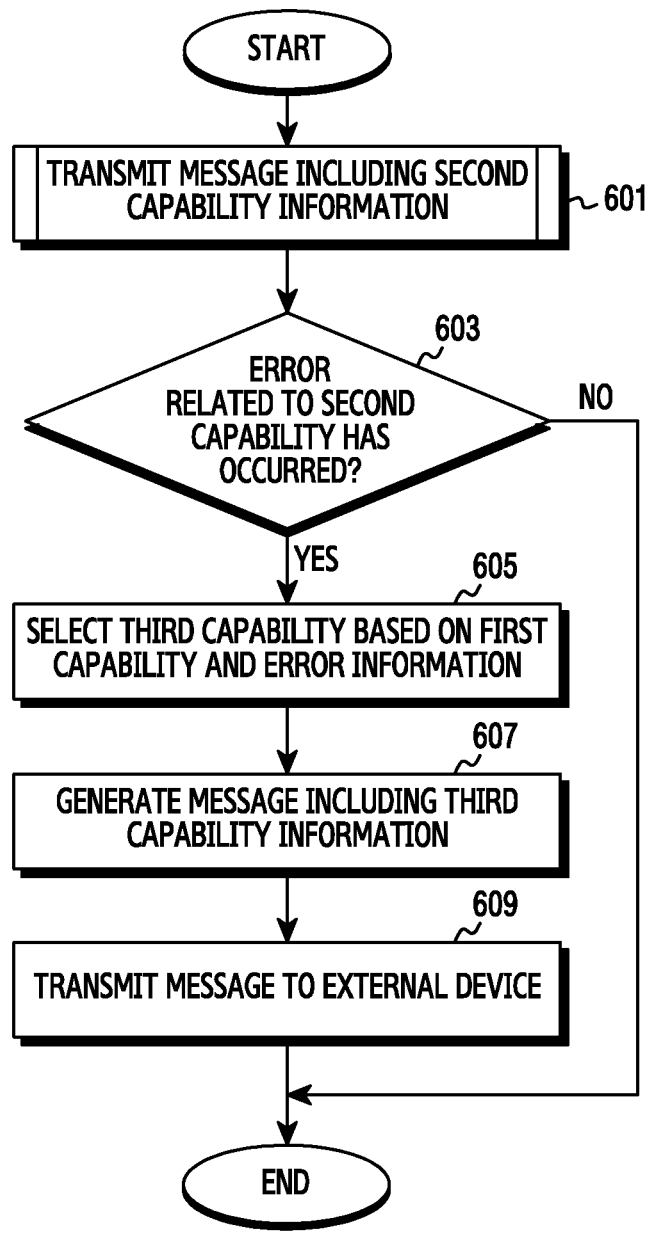
FIG. 6 illustrates a flow chart illustrating an operation of reducing the size of capability information according to an error occurrence due to capability information in an electronic device according to various embodiments of the present disclosure.

FIG. 6 illustrates a flowchart illustrating an operation of reducing the size of capability information according to an error occurrence due to capability information in an electronic device according to various embodiments of the present disclosure. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 6, in operation 601, the electronic device may transmit, to an external device, a message including second capability information selected based on a connection mode that can be supported by at least one external electronic device and an electronic device. For example, as shown in operation 401 to operation 407 in FIG. 4, the processor 120 may transmit, to a base station, a capability report message including the second capability information generated based on a connection scheme that can be supported by an external electronic device and the electronic device 101.

In operation 603, the electronic device may check whether an error has occurred, which is related to the capability report message including the second capability information. For example, when an error has occurred during the network registration process, the processor 120 may check whether an RRC connection is established. When a response for performing the registration process is not received from the network during the reference time or more, in a state where the RRC connection is established, the processor 120 may determine that an error has occurred due to the capability report message. For example, when an RRC connection release message is received during the network registration process by the electronic device 101 in a state where the RRC connection is established, the processor 120 may determine that an error has occurred due to the capability report message. For example, when a response message for the request message for a CSFB transmitted to the network is not received during the reference time or more, the processor 120 may determine that an error has occurred due to the capability report message.

In operation 605, when an error has occurred, which is related to the capability report message including the second capability information, the electronic device may generate third capability information based on error occurrence information and the first capability information on the connection scheme that can be supported by the external electronic device. For example, the processor 120 may detect an error occurrence due to a capability report message including second capability information generated based on a connection scheme that can be supported by a network having an identical mobile country code and the electronic device 101. The processor 120 may extract capability information on the frequency band or RAT of the network corresponding to a mobile network code of a PLMN code among first capability information corresponding to a mobile country code. The processor 120 may extract capability information on the frequency band or RAT that can be supported by the electronic device 101 among capability information on the frequency band or RAT of a network corresponding to a mobile network code, so as to generate third capability information. For example, when it is detected that an error has occurred due to the capability report message generated without considering the forbidden list, the processor 120 may delete capability information on the frequency band or RAT of a network which is included in the forbidden list, from among first capability information corresponding to a mobile country code detected regardless of the forbidden list. The processor 120 may extract capability information on the frequency band or RAT that can be supported by the electronic device 101, from among the first capability information in which capability information on the frequency band or RAT of a network included in the forbidden list is deleted, so as to generate third capability information.

In operation 607, the electronic device may generate a capability report message including the third capability information generated based on error information. For example, the processor 120 may generate a capability report message including third capability information, the size of which is smaller than the second capability information, based on the error information due to the capability report message.

In operation 609, the electronic device may transmit, to an external device, the capability report message including the third capability information. For example, the processor 120 may control the communication interface 170 so as to transmit the capability report message including the third capability information to a base station in response to the error occurrence due to the capability report message including the second capability information.

According to an embodiment, the electronic device may detect an error occurrence due to the capability information message including the third capability information generated by removing capability information of a network included in the forbidden list. In this case, the electronic device may transmit, to an external device, a capability information message, the size of which is reduced based on capability information corresponding to a mobile network code of a PLMN code.

Figure 7:
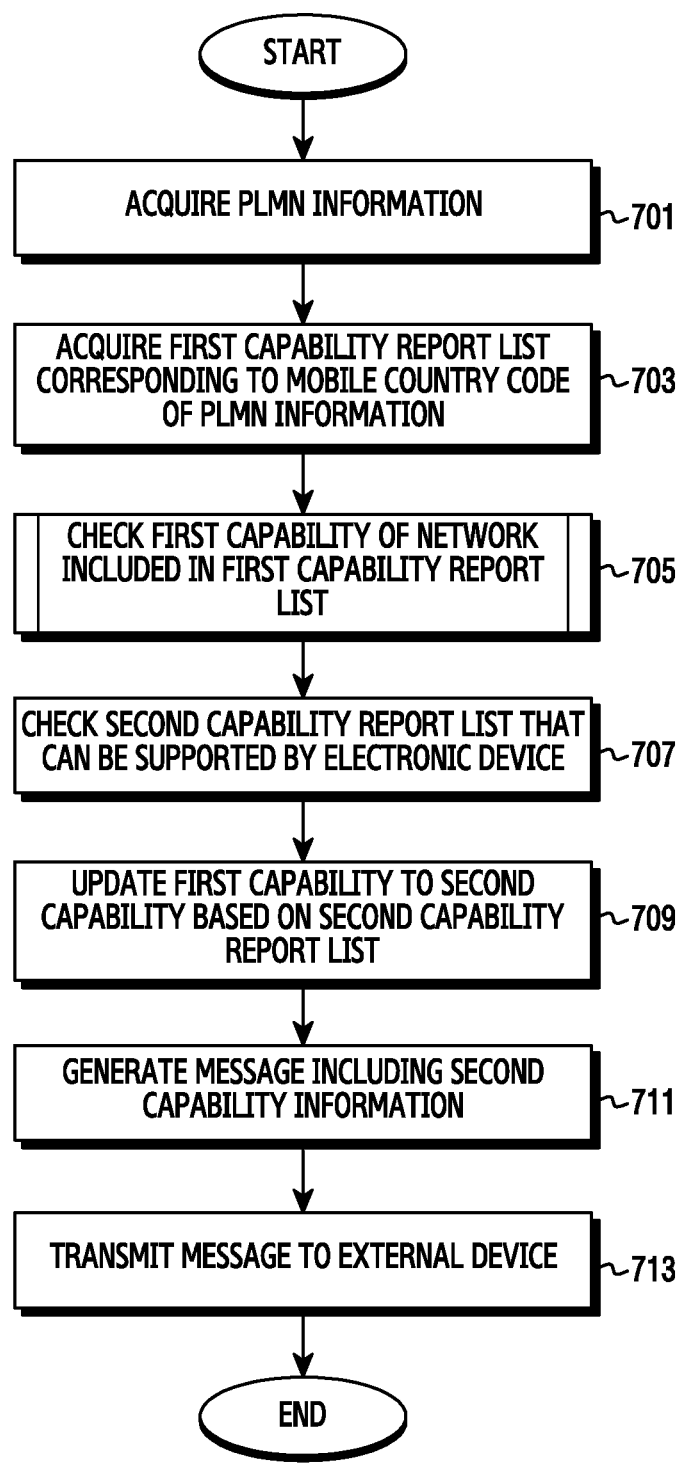
FIG. 7 is a flow chart illustrating the transmission of capability information corresponding to a mobile country code in an electronic device according to various embodiments of the present disclosure.

FIG. 7 is a flow chart illustrating the transmission of capability information corresponding to a mobile country code in an electronic device according to various embodiments of the present disclosure. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 7, in operation 701, the electronic device may acquire a PLMN code of a network from system information provided by the network. For example, the processor 120 may acquire a system information block (SIB) provided by a network in a process of camping on the network through a network search. The processor 120 may acquire a PLMN code of the network from the SIB of the network.

In operation 703, the electronic device may check a first capability report list corresponding to a mobile country code included in the PLMN code. For example, the processor 120 may check, in a database of the memory 130, a list of frequency bands or RATs for at least one network corresponding to a mobile country code.

In operation 705, the electronic device may acquire first capability information on the first capability report list corresponding to the mobile country code. For example, the processor 120 may acquire at least one frequency band or at least one piece of first capability information on at least one network corresponding to a mobile country code. For example, the processor 120 may acquire first capability information based on whether the forbidden list exists, as shown in operations 501 to operation 505 of FIG. 5.

In operation 707, the electronic device may check a second capability report list that can be supported by the electronic device. For example, the processor 120 may check, in the database of the memory 130, a list of frequency bands or RATs that can be supported by the electronic device 101.

In operation 709, the electronic device may update the first capability information to the second capability information based on the second capability report list that can be supported by the electronic device. For example, the processor 120 may extract capability information on a frequency band or RAT included in the second capability report list, from among first capability information on at least one network corresponding to a mobile country code, so as to generate second capability information.

In operation 711, the electronic device may generate a capability report message including the second capability information updated based on the second capability report list that can be supported by the electronic device. For example, when a network requests capability information of the electronic device 101, the processor 120 may generate a capability report message including the second capability information updated based on the second capability report list.

In operation 713, the electronic device may transmit, to the external device, the capability report message including the second capability information.

Figure 8:
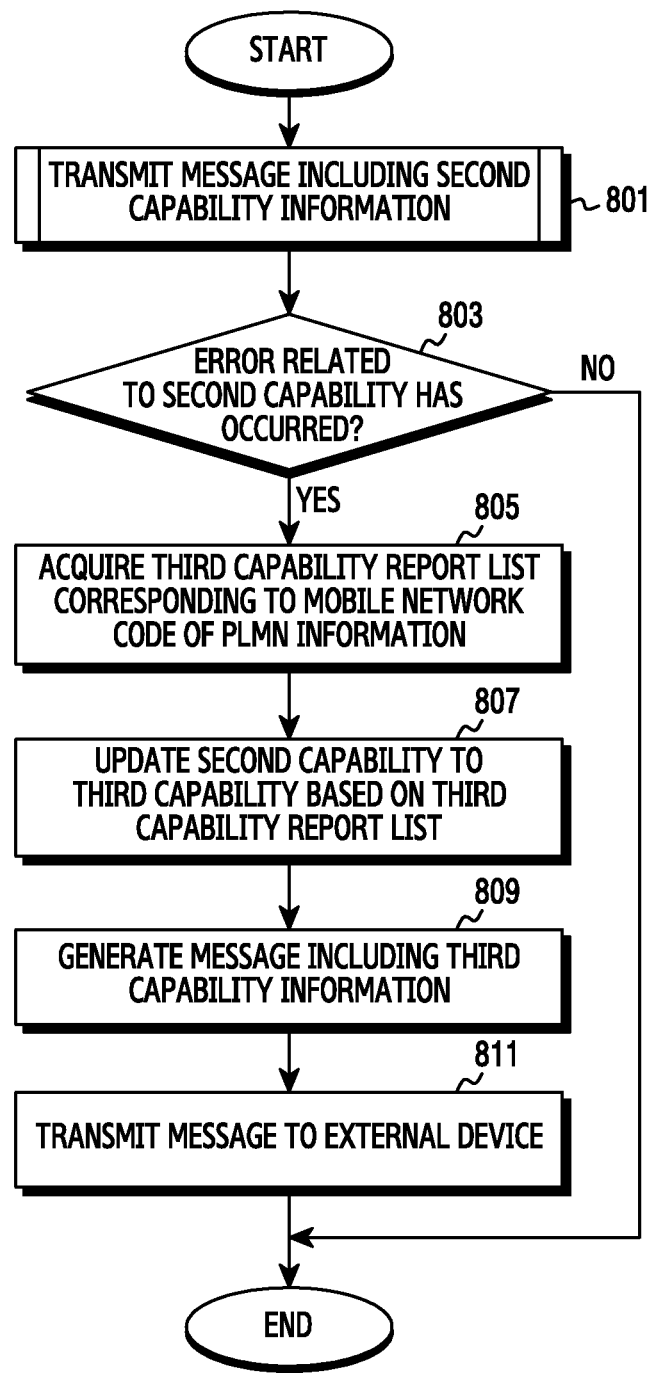
FIG. 8 is a flow chart illustrating an operation of reducing capability information to correspond to a service provider code in an electronic device according to various embodiments of the present disclosure.

FIG. 8 is a flow chart illustrating an operation of reducing capability information to correspond to a service provider code in an electronic device according to various embodiments of the present disclosure. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 8, in operation 801, the electronic device may transmit, to an external device, a message including second capability information selected based on a first capability report list corresponding to a mobile country code and a second capability report list that can be supported by the electronic device. For example, the processor 120 may transmit a capability report message to a base station in a network, as shown in operation 701 to operation 713 in FIG. 7.

In operation 803, the electronic device may check whether an error has occurred, which is related to a capability report message including the second capability information. For example, when an RRC connection release message is received in response to the capability report message in a state where an RRC connection is established, the processor 120 may determine that an error has occurred due to the capability report message. For example, when a response message for a request message for a CSFB transmitted to the network is not received during the reference time, the processor 120 may determine that an error has occurred due to the capability report message.

In operation 805, when an error has occurred, which is related to the capability report message including the second capability information, the electronic device may check a third capability report list corresponding to a mobile network code of a PLMN code. For example, the processor 120 may check, in the database of the memory 130, a list of frequency bands or RATs that can be supported by a network corresponding to the mobile network code of the PLMN code.

In operation 807, the electronic device may update the second capability information to third capability information, in which the second capability information is included in the capability report message in which an error has occurred based on the third capability report list corresponding to the mobile network code. For example, the processor 120 may generate the third capability information by removing, from the second capability information, capability information on a frequency or an RAT that is not included in the third capability report list. For example, the third capability information may include capability information on a frequency or an RAT included in the third capability report list corresponding to the mobile network code and the second capability report list that can be supported by the electronic device 101.

In operation 809, the electronic device may generate a capability report message including the third capability information generated based on the third capability report list corresponding to the mobile network code. For example, the processor 120 may generate a capability report message including third capability information, in which the size is smaller than that of the capability report message including the second capability information.

In operation 811, the electronic device may transmit, to the external device, the capability report message including the third capability information.

According to an embodiment, an electronic device (e.g., the electronic device 101) may extract a third capability report list corresponding to a mobile network code from a database stored in a memory (e.g., the memory 130). For example, the third capability report list may include a frequency band or RAT that can be supported by a network corresponding to the mobile network code.

According to an embodiment, an electronic device (e.g., the electronic device 101) may receive, from the network, the frequency band or RAT information of the corresponding network. For example, the processor 120 may acquire information on the serving frequency and other frequency from the system information (e.g., SIB) provided by the network. For example, the processor 120 may check information on the frequency band or RAT that can be supported by the network from MeasObject information received from the network through the RRC connection reconfiguration.

Figure 9:
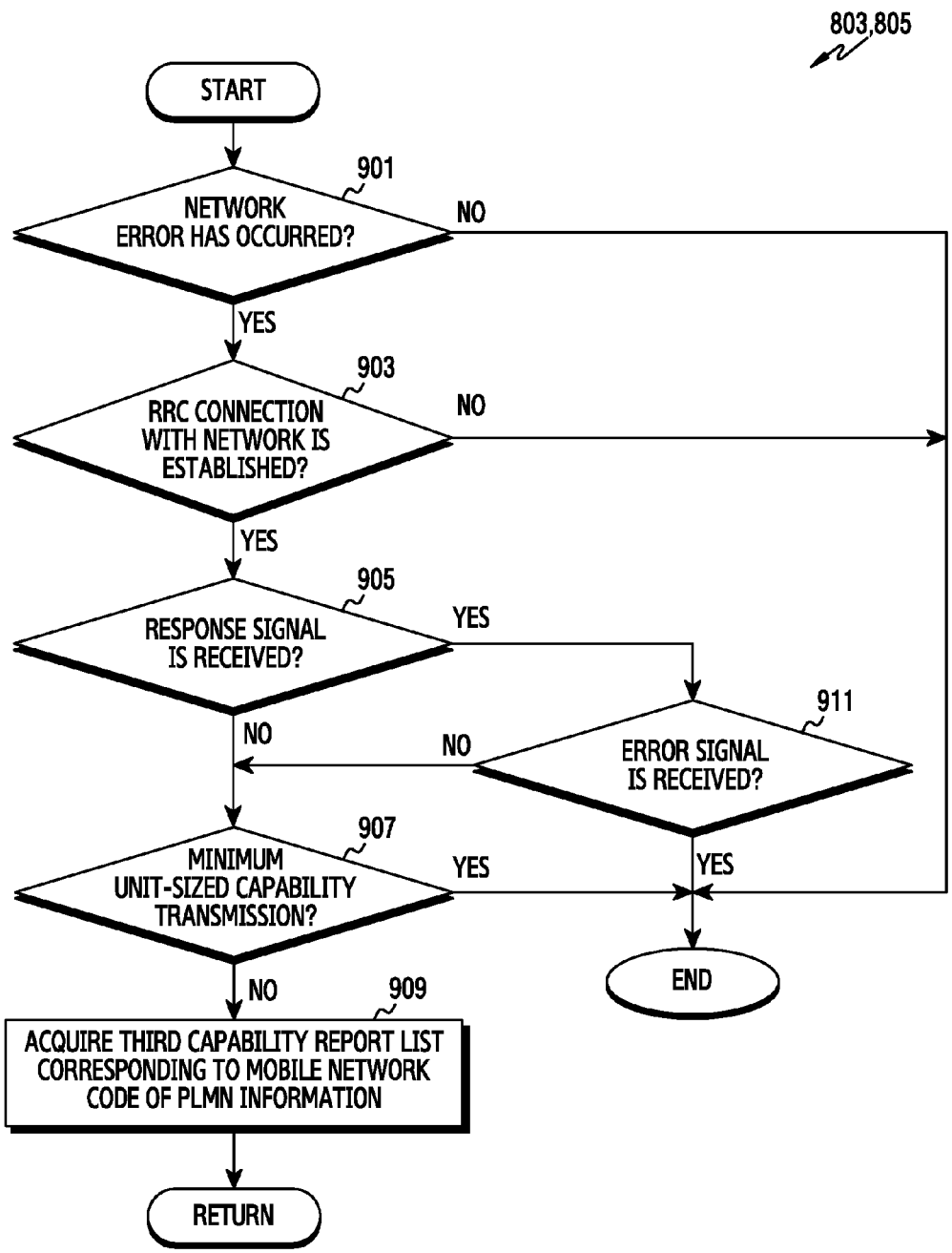
FIG. 9 is a flow chart illustrating the determination of whether an error has occurred due to capability information in an electronic device according to various embodiments of the present disclosure.

FIG. 9 is a flow chart illustrating the determination of whether an error has occurred due to capability information in an electronic device according to various embodiments of the present disclosure. Hereinafter, an operation for determining whether an error has occurred due to a capability report message will be described in in operation 803 and operation 805 in FIG. 8. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 9, in operation 901, the electronic device may check whether a network error has occurred when a message including second capability information generated based on a first capability report list corresponding to a mobile country code and a second capability report list that can be supported by the electronic device is transmitted to an external device. For example, the processor 120 may check whether an error has occurred during a registration process with the network. For example, the processor 120 may check whether an error has occurred during a request for a CSFB service for providing a voice service.

In operation 903, when a network error has occurred, the electronic device may check whether an RRC connection with the network is established. For example, when an error has occurred during the network registration process, the processor 120 may check whether an RRC connection with the corresponding network is established. For example, when the CSFB service request is made to the network, the processor 120 may check whether an RRC connection with the corresponding network is established.

In operation 905, when an RRC connection with the network is established, the electronic device may check whether a response message with respect to a control message transmitted to the network is received. For example, the processor 120 may check whether a response message to a capability report (UE capability information) message which is transmitted from the network for the registration of the network is received during the reference time. For example, the reference time may include a validity time from a time point at which the capability report message is transmitted to a time point at which a response message is received. For example, when the processor 120 receives a voice service request message while accessing an LTE network and providing a data service, the processor 120 may transmit, to the network, a CSFB service request (e.g., an extended service request) message, in order to switch to a Circuit Switching (CS) network (e.g., 2G or 3G network). The processor 120 may check whether a response message (e.g., RRC connection release) for the CSFB service request message is received during the reference time. For example, the reference time may include a validity time from a time point at which the CSFB service report message is transmitted to a time point at which a response message is received.

In operation 911, when the response message for the control message transmitted to the network is received within the reference time, the electronic device may check whether an error message has been received. For example, for the network registration, the processor 120 may transmit a capability report message (e.g., UE capability information) to the corresponding network in a state where the RRC connection is established. When an RRC connection release message (e.g., RRC connection release) is received in response to the capability report message, the processor 120 may confirmed that an error has occurred due to the capability report message.

In operation 907, when the response message for the control message transmitted to the network is not received during the reference time or an error message is received, the electronic device may check whether the capability information included in the capability report message is capability information of the minimum unit size. For example, the processor 120 may check whether the second capability information included in the capability report message transmitted to the external electronic device in operation 713 in FIG. 7 is capability information of the minimum unit size that can be transmitted through the capability report message. That is, the processor 120 may check whether the first capability information used to generate the second capability information is capability information of the minimum unit size.

In operation 909, when the capability information included in the capability report message is not capability information of the minimum unit size, the electronic device may acquire a third capability report list corresponding to a mobile network code of a PLMN code.

Figure 10:
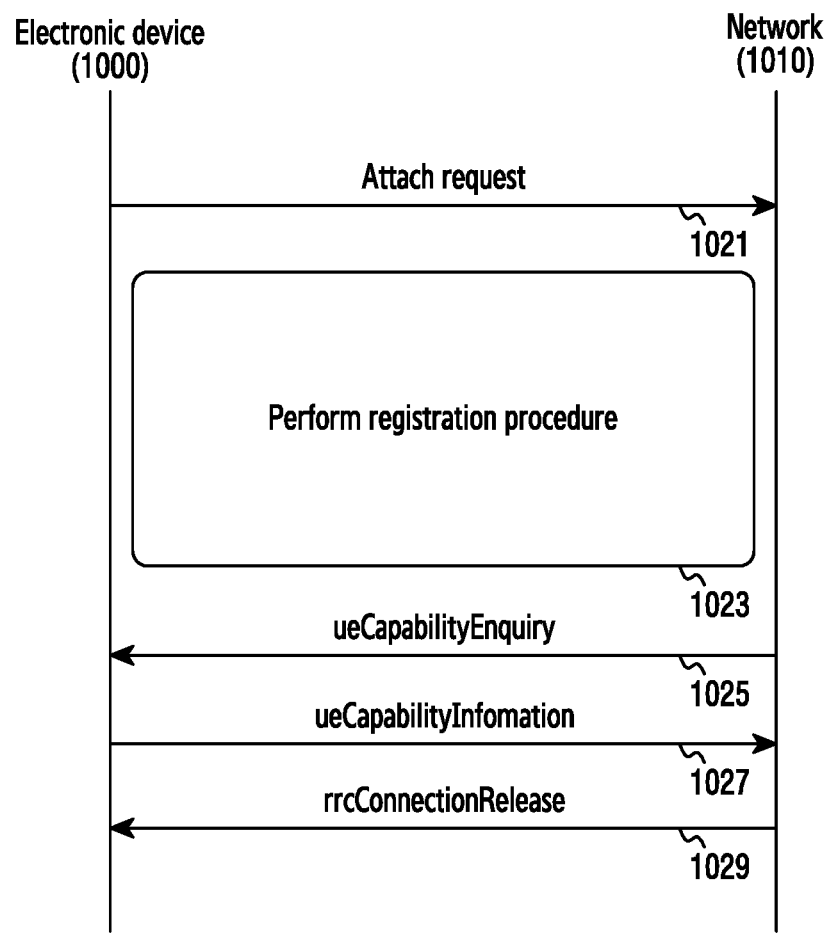
FIG. 10 is a signal flow chart illustrating the determination of whether an error has occurred due to capability information of an electronic device, in a registration procedure of an electronic device in a wireless communication system according to various embodiments of the present disclosure.

FIG. 10 is a signal flow chart illustrating the determination of whether an error has occurred due to capability information of an electronic device, in a registration procedure of an electronic device in a wireless communication system according to various embodiments of the present disclosure. According to an embodiment, the electronic device 1000 may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 10, the electronic device 1000 may search for a network in which a signal is received, through a cell search, and establish an RRC connection through a specific network.

After configuring the RRC connection, the electronic device 1000 may transmit, to a network 1010, a control message (e.g. an attach request) requesting registration to the network (indicated by reference numeral 1021). For example, a control message requesting registration to the network may include identification information of the electronic device 1000.

When the control message requesting the registration is received from the electronic device 1000, the network 1010 may perform a registration procedure for the electronic device 1000 (indicated by reference numeral 1023). For example, the network 1010 may check authentication information, a security mode, and Evolved Packet System (EPS) Session Management (ESM) information of the electronic device 1000 so as to authenticate the electronic device 1000.

When the registration procedure of the electronic device 1000 is performed, the network 1010 may transmit, to the electronic device 1000, control message (e.g., UE capability enquiry) requesting capability information of the electronic device 1000 (indicated by reference numeral 1025). For example, when the network 1010 stores capability information of the electronic device 1000, the network 1010 may include capability-related information of the electronic device 1000 in the control message requesting the capability information of the electronic device 1000 and transmit the same. For example, when the network 1010 does not store the capability information of the electronic device 1000, the network 1010 may transmit, to the electronic device 1000, a control message requesting the capability information of the electronic device 1000, which does not include the capability-related information of the electronic device 1000.

When a control message requesting capability information is received from the network 1010, the electronic device 1000 may transmit, to the network 1010, a capability report message (e.g., UE capability information) including capability information of the electronic device 1000 (indicated by reference numeral 1027). For example, as shown in FIG. 7, the electronic device 1000 may transmit, to the network 1010, the capability report message generated based on capability information of at least one network corresponding to a mobile country code. For example, as shown in FIG. 8, the electronic device 1000 may transmit, to the network 1010, the capability report message generated based on capability information of a network corresponding to a mobile network code.

The network 1010 may determine that an error has occurred when the size of the capability report message provided from the electronic device 1000 is larger than the reference size. For example, when the size of the capability report message is larger than the reference size, the network 1010 may determine that an error has occurred because the corresponding capability report message cannot be decoded.

When it is determined that an error has occurred in the capability report message provided from the electronic device 1000, the network 1010 may transmit an RRC connection release message (e.g., an RRC connection release) to the electronic device 1000 (indicated by reference numeral 1029).

When the RRC connection release message is received in response to the capability report message, the electronic device 1000 may determine that a network error has occurred due to the capability report message. Accordingly, the electronic device 1000 may regenerate capability report information by reducing the size of capability report information so as to transmit the same to the network 1010.

According to an embodiment, when the size of the capability report message provided from the electronic device 1000 is equal to or smaller than the reference size, the network 1010 may check a traffic situation or channel situation of the electronic device 1000 based on the capability report message. The network 1010 may establish or re-establish communication with the electronic device 1000 with reference to the traffic situation or channel situation of the electronic device 1000.

Figure 11:
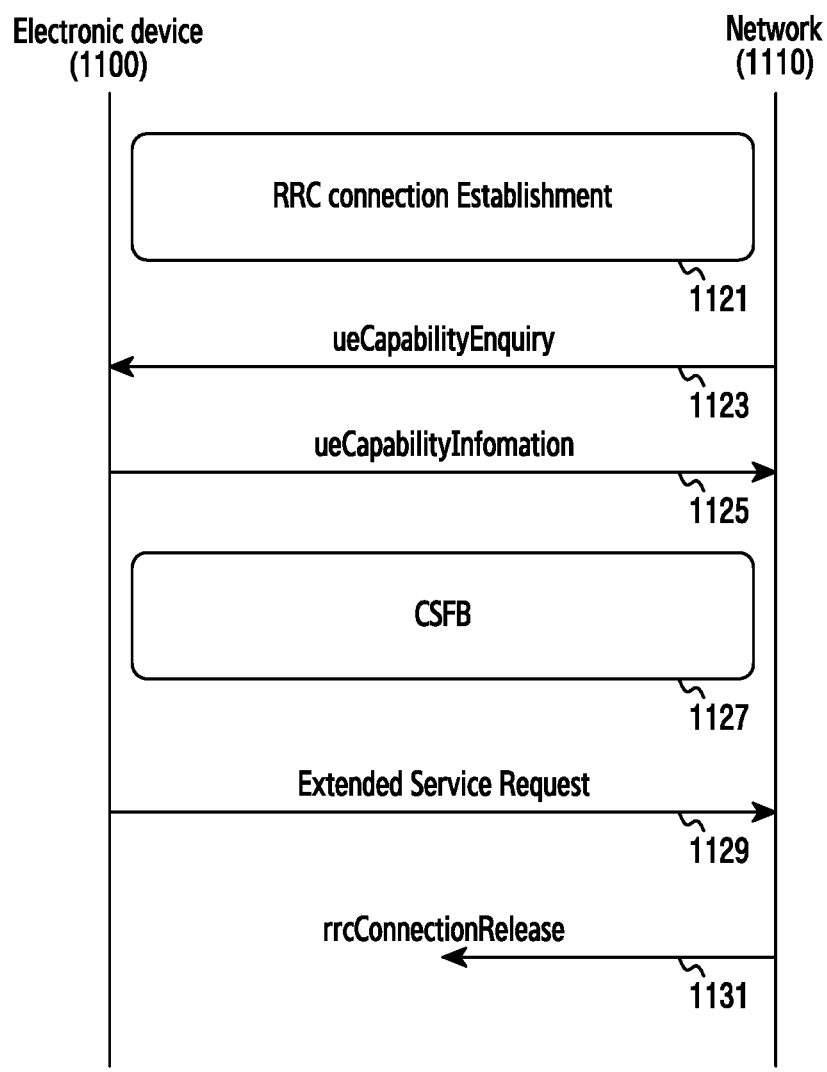
FIG. 11 is a signal flow chart illustrating the determination of whether an error has occurred due to capability information of an electronic device, in a CSFB process in a wireless communication system according to various embodiments of the present disclosure.

FIG. 11 is a signal flow chart illustrating the determination of whether an error has occurred due to capability information of an electronic device, in a CSFB process in a wireless communication system according to various embodiments of the present disclosure. According to an embodiment, the electronic device 1100 may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 11, the electronic device 1100 may search for a network in which a signal is received, through a cell search, and establish an RRC connection through a network 1110 (indicated by reference numeral 1121).

The network 1110 may perform a registration procedure with the electronic device 1100. For example, the network 1110 may perform an authentication procedure for the electronic device 1100.

When the registration procedure with the electronic device 1100 is performed, the network 1110 may transmit, to the electronic device 1100, the control message (e.g., UE capability enquiry) requesting capability information of the electronic device 1100 (indicated by reference numeral 1123).

When a control message requesting capability information is received from the network 1110, the electronic device 1100 may transmit, to the network 1110, a capability report message (e.g., UE capability information) including capability information of the electronic device 1100 (indicated by reference numeral 1125). For example, as shown in FIG. 7, the electronic device 1100 may transmit, to the network 1110, the capability report message generated based on a first capability report list corresponding to a mobile country code and a second capability report list that can be supported by the electronic device 1100. For example, as shown in FIG. 8, the electronic device 1100 may transmit, to the network 1110, the capability report message generated based on a third capability report list corresponding to a mobile country code and a second capability report list that can be supported by the electronic device 1100.

When the electronic device 101 receives a voice service request signal while accessing the network 1110 (e.g., an LTE network) and providing data services (indicated by reference numeral 1127), the electronic device 1100 may transmit, to the network 1110, the control message (e.g., an extended service request) for switching a serving network to a CS network for voice services (indicated by reference numeral 1129).

When the capability information of the electronic device 1100 can be checked through the capability report message provided from the electronic device 1100, the network 1110 can transmit an RRC connection release message (e.g., RRC connection release) to the electronic device 1100.

According to an embodiment, when the capability information of the electronic device 1100 cannot be checked through the capability report message provided from the electronic device 1100, the network 1110 cannot transmit, to the electronic device 1100, a response message for the control message for switching to a CS network (indicated by reference numeral 1131).

When the response message is not received during the reference time after transmitting the control message for switching to the CS network, the electronic device 1100 may determine that a network error has occurred due to the capability report message. Accordingly, the electronic device 1100 may regenerate capability report information by reducing the size of capability report information so as to transmit the same to the network 1110.

Figure 12:
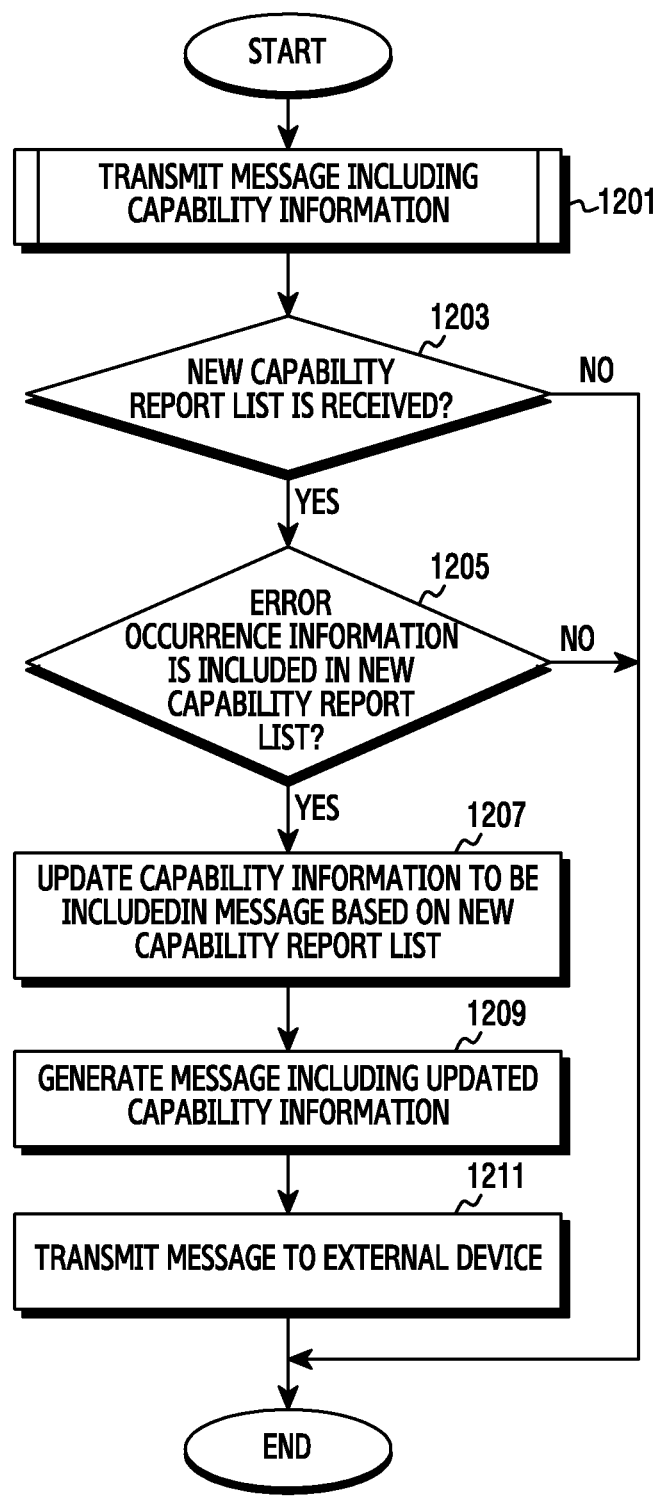
FIG. 12 is a flow chart illustrating the update of capability information in an electronic device according to various embodiments of the present disclosure.

FIG. 12 is a flow chart illustrating the updating of capability information in an electronic device according to various embodiments of the present disclosure. According to an embodiment, the electronic device may include the electronic device 101 of FIG. 1, the electronic device 201 of FIG. 2, at least some of the electronic device 101 (e.g., the processor 120), or at least some of the electronic device 201 (e.g., a communication processor).

Referring to FIG. 12, in operation 1201, the electronic device may transmit, to an external device, a capability report message including capability information on at least one frequency band or at least one RAT. For example, as shown in FIG. 7, the processor 120 may transmit, to a base station, the capability report message generated based on a first capability report list corresponding to a mobile country code and a second capability report list that can be supported by the electronic device 101. For example, as shown in FIG. 8, the processor 120 may transmit, to the base station, the capability report message generated based on a third capability report list corresponding to a mobile network code and the second capability report list that can be supported by the electronic device 101.

In operation 1203, the electronic device may check whether a new capability report list is received from a network. For example, the processor 120 may check, through the communication interface 170, whether a new frequency band or RAT information is received from the network.

In operation 1205, when a new capability report list is received from the network, the electronic device may check whether there is error occurrence information on the frequency band or the RAT included in the new capability report list. For example, the processor 120 may check whether the new capability report list has been included in the capability report message at the time of occurrence of an error related to the capability report message.

When error occurrence information on the frequency band or the RAT included in the new capability report list exists, the electronic device may maintain the capability information included in the capability report message. For example, the processor 120 may maintain the capability report list for the capability report message.

In operation 1207, when error occurrence information on the frequency band or RAT included in the new capability report list does not exist, the electronic device may update the capability information for the capability report so as to include the new capability report list. For example, the processor 120 may acquire at least one frequency band or at least one RAT information included in a capability report list including the new capability report list.

In operation 1209, the electronic device may generate a capability report message including the updated capability information. For example, when the network requests capability information of the electronic device 101, the processor 120 may generate a capability report message including the updated capability information.

In operation 1211, the electronic device may transmit, to an external device, the capability report message including the updated capability information.

According to various embodiments of the present disclosure, a method for operating an electronic device may include: checking, by an electronic device, first capability information on a plurality of connection schemes which can be supported by an external electronic device; selecting second capability information including at least one connection scheme which can be supported by the electronic device from among the plurality of connection schemes, based on the first capability information; generating a message using the second capability information; and transmitting the message to the external electronic device.

According to various embodiments, the checking of the first capability information may include: acquiring the capability of the external electronic device when the identification information on the external electronic device belongs to one or more pieces of identification information on one or more external electronic devices for which connections are permitted.

According to various embodiments, the selecting of the second capability information may include: checking, in relation to the second capability information, information on an error which has previously occurred in a process of connecting with the external electronic device, and refrain from selecting at least a part of the second capability information when the second capability information is included in the error information.

According to various embodiments, the method may further include: receiving a response message from the external electronic device; and selecting third capability information using the first capability information and error information when the response message includes error information related to the second capability information, wherein the third capability information may be selected such that the size is smaller than that of the second capability information.

According to various embodiments, the external electronic device includes a network, wherein the checking of the first capability information may include: making a request for the first capability information to at least one network, among the networks, in which country mobile codes of a public land mobile network (PLMN) code are identical but mobile network codes are different from each other.

According to various embodiments, the external electronic device includes a network, wherein the checking of the first capability information may include: requesting for the first capability information to at least one network, among the networks, which corresponds to a mobile network code included in a PLMN code.

According to various embodiments, the connection scheme may include at least one frequency band or at least one Radio Access Technology (RAT).

According to various embodiments, the method may further include: checking, when an error related to the message is detected, third capability information on a plurality of connection schemes which can be supported by a network corresponding to a mobile network code of a PLMN code; selecting fourth capability information including at least one connection scheme which can be supported by the electronic device from among the plurality of connection schemes, based on the third capability information; and transmit a message including the fourth capability information to the network.

According to various embodiments, the checking of the first capability information may further include: checking first capability information on a plurality of connection schemes that can be supported by at least one network in which mobile country codes of the PLMN code are identical and mobile network codes thereof are different from each other.

According to various embodiments, the checking of the first capability information may include: when a forbidden PLMN (FPLMN) list exists, checking first capability information on a plurality of connection schemes that can be supported by at least one network in which mobile country codes of the PLMN code are identical except for network information included in the FPLMN list and mobile network codes thereof are different from each other.

An electronic device and method therefor according to various embodiments may limit the size of capability information of the electronic device, based on a frequency band or a Radio Access Technology (RAT) corresponding to a mobile country code or a service provider code, so as to accurately recognize the capability information of the electronic device.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating an electronic device, the method comprising:
    identifying, by the electronic device, first capability information on a plurality of connection schemes that can be supported by an external electronic device;
    selecting, based on the first capability information, second capability information including at least one connection scheme that can be supported by the electronic device from among the plurality of connection schemes that can be supported by the external electronic device;
    generating a message using the second capability information;
    transmitting the message to the external electronic device;
    receiving a response message from the external electronic device; and
    upon determining that the response message includes error information related to the second capability information, selecting third capability information using the first capability information and the error information.

2. The method of claim 1, wherein identifying the first capability information comprises: acquiring capability information of the external electronic device upon determining that identification information on the external electronic device belongs to one or more pieces of identification information on one or more external electronic devices for which connections are permitted.

3. The method of claim 1, wherein selecting of the second capability information comprises:
    identifying, in relation to the second capability information, information on an error which has previously occurred in a process of a connection with the external electronic device; and
    refraining from selecting at least a part of the second capability information when the second capability information is included in the information on the error.

4. The method of claim 1,
    wherein the third capability information is selected such that a size of the third capability information is smaller than a size of the second capability information.

5. The method of claim 1, wherein the external electronic device comprises networks, and
    wherein the identifying of the first capability information comprises: transmitting a request for the first capability information to at least one network, among the networks, in which mobile country codes of a Public Land Mobile Network (PLMN) code are identical to each other but mobile network codes are different from each other.

6. The method of claim 1, wherein the external electronic device comprises networks, and
    wherein the identifying of the first capability information comprises: transmitting a request for the first capability information to at least one network, among the networks, which corresponds to a mobile network code included in a PLMN code.

7. The method of claim 1, wherein the connection scheme comprises at least one frequency band or at least one Radio Access Technology (RAT).

8. The method of claim 1, further comprising:
    identifying, when an error related to the message is detected, third capability information on a plurality of connection schemes that can be supported by a network corresponding to a mobile network code of a PLMN code;
    selecting, based on the third capability information, fourth capability information including at least one connection scheme that can be supported by the electronic device from among the plurality of connection schemes that can be supported by at least one network; and
    transmitting a message including the fourth capability information to the network.

9. The method of claim 8, wherein identifying the first capability information comprises: identifying first capability information on a plurality of connection schemes that can be supported by the at least one network in which mobile country codes of the PLMN code are identical to each other and mobile network codes thereof are different from each other.

10. The method of claim 8, wherein identifying of the first capability information comprises: identifying, upon determining that a forbidden PLMN (FPLMN) list exists, first capability information on a plurality of connection schemes that can be supported by the at least one network in which mobile country codes of the PLMN code are identical to each other and mobile network codes thereof are different from each other, except for network information included in the FPLMN list.

11. An electronic device comprising:
a memory configured to store a parameter corresponding to a wireless communication connection scheme that can be supported by the electronic device;
a communication module; and
a processor,
wherein the processor is configured to:
identify first capability information on a plurality of connection schemes that can be supported by an external electronic device;
select, based on the first capability information and the parameter, second capability information including at least one connection scheme that can be supported by the electronic device among the plurality of connection schemes that can be supported by the external electronic device;
generate a message using the selected second capability information;
control the communication module to transmit the message to the external electronic device;
receive a response message from the external electronic device, using the communication module; and
upon determining that the response message includes error information related to the second capability information, select third capability information using the first capability information and the error information.

12. The electronic device of claim 11, wherein the processor is configured to: acquire capability information of the external electronic device upon determining that identification information on the external electronic device belongs to one or more pieces of identification information on one or more external electronic devices for which connections are permitted.

13. The electronic device of claim 11, wherein the processor is configured to:
identify, in relation to the second capability information, information on an error which has previously occurred in a process of connecting with the external electronic device; and
refrain from selecting at least a part of the second capability information when the second capability information is included in the information on the error.

14. The electronic device of claim 11,
wherein the third capability information is selected such that a size of the third capability information is smaller than a size of the second capability information.

15. The electronic device of claim 11, wherein the external electronic device comprises networks, and
wherein the processor is configured to transmit a request for the first capability information to at least one network, among the networks, in which mobile country codes of a Public Land Mobile Network (PLMN) code are identical to each other but mobile network codes thereof are different from each other.

16. The electronic device of claim 11, wherein the external electronic device comprises networks, and
wherein the processor is configured to transmit a request for the first capability information to at least one network, among the networks, which corresponds to a mobile network code included in a PLMN code.

17. The electronic device of claim 11, wherein the connection scheme comprises at least one frequency band or at least one Radio Access Technology (RAT).

18. An electronic device comprising:
a memory configured to store a parameter corresponding to a wireless communication connection scheme that can be supported by the electronic device;
a communication module; and
a processor,
wherein the processor is configured to:
identify first capability information on a plurality of connection schemes that can be supported by at least one network in which mobile country codes of a public land mobile network codes are identical;
select, based on the first capability information and the parameter, second capability information including at least one connection scheme that can be supported by the electronic device among the plurality of connection schemes that can be supported by the at least one network;
control the communication module to transmit a first message including the second capability information to the network;
upon detecting that an error related to the first message is detected, identify, using the first capability information and information on the error, third capability information on a plurality of connection schemes that can be supported by a network corresponding to a mobile network code of the PLMN code;
select, based on the third capability information and the parameter, fourth capability information including at least one connection scheme that can be supported by the electronic device from among the plurality of connection schemes that can be supported by the at least one network; and
control the communication module to transmit a message including the fourth capability information to the network.

19. The electronic device of claim 18, wherein the processor is configured to: identify first capability information on a plurality of connection schemes that can be supported by at least one network in which mobile country codes of the PLMN code are identical to each other and mobile network codes thereof are different from each other.

20. The electronic device of claim 18, wherein the processor is configured to: identify, upon determining that a Forbidden PLMN (FPLMN) list exists, first capability information on a plurality of connection schemes that can be supported by at least one network in which mobile country codes of the PLMN code are identical to each other and mobile network codes thereof are different from each other, except for network information included in the FPLMN list.

* * * * *